United States Patent
Shipman

[11] 3,838,680
[45] Oct. 1, 1974

[54] COMBINATION HEATING AND SERVING ASSEMBLY

[76] Inventor: Paul Shipman, 3835 Ridgely Dr., Los Angeles, Calif. 90008

[22] Filed: July 16, 1973

[21] Appl. No.: 379,458

[52] U.S. Cl. .................. 126/373, 126/215, 220/8
[51] Int. Cl. .......................................... A47j 27/00
[58] Field of Search ........ 126/373, 363, 215; 220/8, 220/69

[56] References Cited
UNITED STATES PATENTS

| | | | |
|---|---|---|---|
| 750,632 | 1/1904 | Fisher | 220/8 UX |
| 1,337,524 | 4/1920 | Levy | 126/215 |
| 2,487,605 | 11/1949 | Smith | 126/373 X |

FOREIGN PATENTS OR APPLICATIONS

| | | | |
|---|---|---|---|
| 132,857 | 5/1929 | Switzerland | 126/373 |

Primary Examiner—Charles J. Myhre
Assistant Examiner—William C. Anderson
Attorney, Agent, or Firm—Howard L. Johnson

[57] ABSTRACT

A container for heating liquids such as soup, coffee, etc. having a laterally projecting bottom spigot for serving same, the container having an outer telescopic jacket which is downwardly extensible upon removal of the assembly from a heating source, so as to support the thus elevated container and dispose the spigot at a convenient height above a cup or serving vessel. Jacket is formed with a trio of vertical guide channels which form tracks for guide pins projecting from container, with transversely disposed anchorage slots at top and bottom of channels to hold container and jacket together for carrying in either position. Each end of top handle or bail pivoted to container has dependently projecting lever disposed to raise bottom edge of telescoped jacket from level of heating surface on which container rests, such adjustment effected by swinging handle from vertical to lateral position.

5 Claims, 5 Drawing Figures

PATENTED OCT 1 1974　　　　　　　　　　　　　　3,838,680
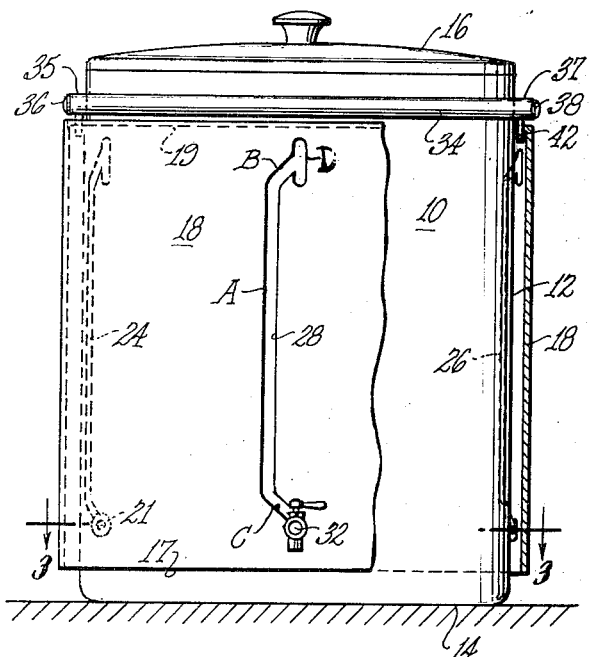
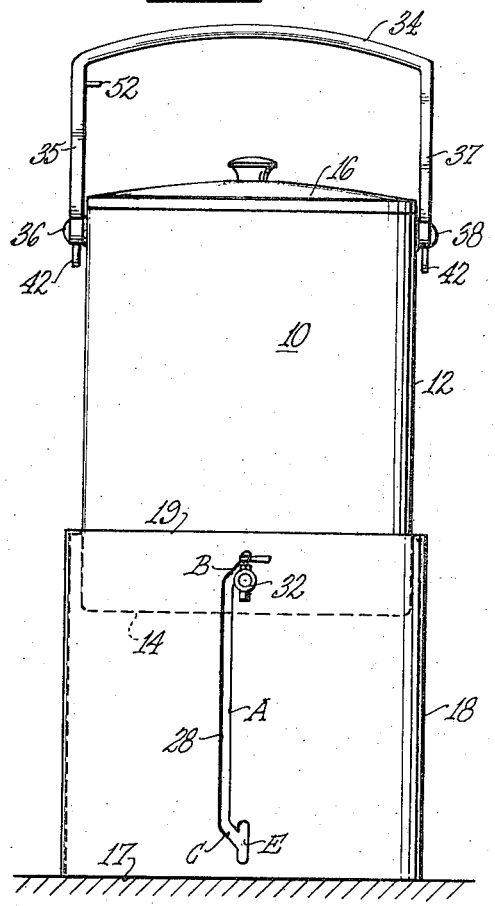
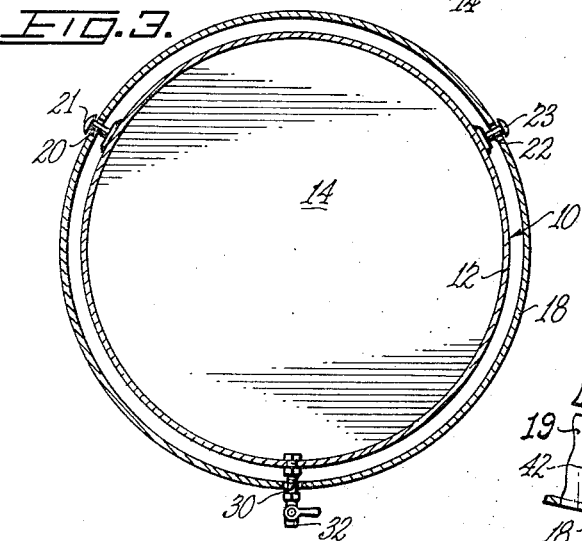
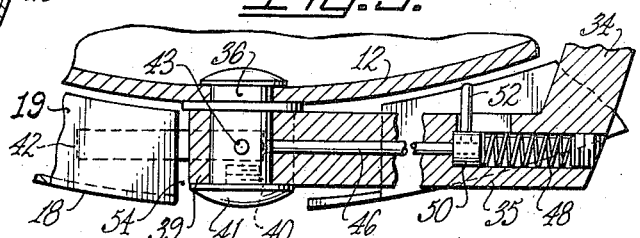
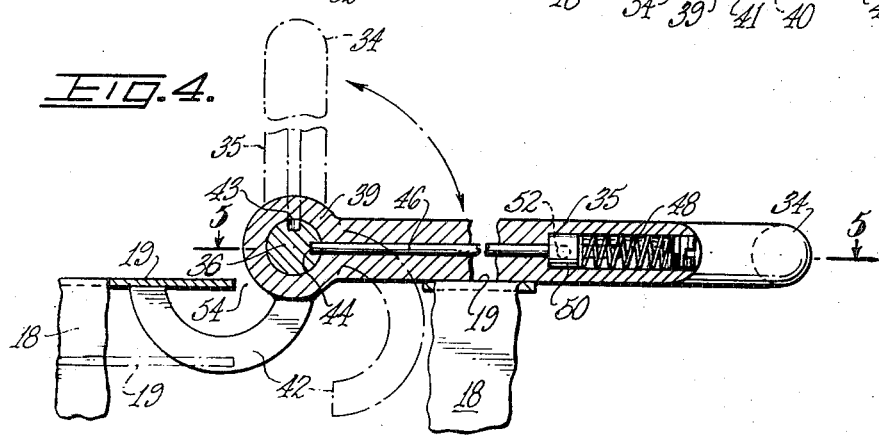

COMBINATION HEATING AND SERVING ASSEMBLY

BACKGROUND OF THE INVENTION

After having a beverage such as chocolate, coffee, tea or broth on a stove or hot plate, it is desired to pour the liquid into successive cups or containers which may be at a different location where it is inconvenient to place the hotbottom container, and in any event requires it to be lifted for pouring and replaced as many different times as there are appreciable intervals between successive pourings. Thus it would be desirable: (a) to be able to carry the entire container and contents into another room, rather than first emptying the contents into a cooler vessel(s) all at once, (b) to be able to place the container on any convenient support surface without protection or guarding against the overheated bottom surface, (c) to pour successive servings without having to lift and/or tip the container each time.

BRIEF STATEMENT OF THE INVENTION

Accordingly the invention provides such a heating container which does not require the liquid to be emptied by tipping the vessel to pour from a top spout because it can be drained from a bottom lateral outlet, and the latter can be done without raising the vessel each time in order to get a cup or glass beneath it. In addition, the unit may be moved to any convenient table or ledge without fear of burning the latter because of telescopic support means which at will allow the container to be shifted between heating level and serving level.

In brief, there is provided an essentially flatbottom cylindrical container, movably fastened to a spacedly encircling, tubular jacket of the same shape, which jacket is shiftable (by manipulation of the container handle) between an elevated serving position wherein the container bottom and spigot are supported by the jacket adjacent its top edge, and a collapsed heating (cooking) position, wherein the lower edge of the jacket is held raised a small distance above the container bottom so as to avoid direct contact with the heat or flame.

The jacket is formed with somewhat less height than the surrounded container and has a trio of circumferentially spaced, generally vertical guide slots or tracks (with laterally displaced anchorage sockets at each end) through which respective slots are received a projecting pair of guide pins and the spigot conduit.

The container has a top, pivoted bail-like handle, lockable in respective horizontal and vertical positions (the latter for carrying and rotating the assembly) and each pivotally mounted end of the handle has a downward projecting lever arm thus located between the container and jacket and disposed to lift and hold the latter a small distance when the jacket is in the telescoped position so that its lower edge is elevated above the bottom level of the container and hence not directly exposed to the source of heat. The vertical guide slots have laterally displaced sockets or anchorage positions at each end so that the container and jacket can be retained in either extreme (vertical) position for stability including moving the assembly from place to place.

BRIEF DESCRIPTION OF THE DRAWINGS:

FIG. 1 is an elevational view of my heating and serving assembly, shown in retracted position for heating, with the right portion of the jacket broken away.

FIG. 2 is an elevational view of the same in fully extended position and with the handle raised vertically.

FIG. 3 is a horizontal sectional view taken on line 3—3 of FIG. 1.

FIG. 4 is an enlarged detail view of the handle construction, partly in vertical section, with the elevated position shown in phantom.

FIG. 5 is a horizontal sectional view taken through the handle at 90° rotation from the position of FIG. 4, viewed along the line 5—5.

DETAILED DESCRIPTION OF PREFERRED EMBODIMENT

As here illustrated the liquid container 10 is conveniently formed with cylindrical side walls 12 and more-or-less flat bottom 14 which is adapted to be placed over a source of heat such as a gas burner, electric plate or coil, or the flat top of a coal or wood stove. The top of the container has a removable cover or lid 16 which could carry an escape vent if desired. Likewise conventional coffee percolator elements may be present but for simplicity of illustration are omitted.

Spaced outward from the cylindrical wall 12 a small distance is a concentric or coaxial shell or jacket 18, adapted in one position to form an outer telescopic support for the container, and in contracted position forming something of a heat shield. The jacket is somewhat less height than the surrounded container and is movably connected thereto at three circumferentially separated points, equally spaced apart, i.e., arcuately. Two of the attachment points are provided by a pair of radially directed, headed pins or studs 20, 22 which extend fixedly from the container wall 12 through upright guide slots 24, 26 of the jacket with their flanged ends or heads 21, 23 outwardly overlying the respective slot. The third guide slot 28 is radially traversed by the tubular pin or conduit 30 of a drainage outlet or spigot 32 by which the liquid contents of the container may be drawn off from time to time.

The top of the jacket is formed with an inturned lip 19 which loosely or slidably embraces the outer periphery of the container. Each of the guide slots 24, 26, 28 consists of a central vertical stretch A, short terminal angular lengths B, C, which lead to respective vertical lengths D, E at top and bottom, the respective ends of the lengths D, E forming sockets or anchorage positions for the trio of pins.

The liquid container 10 is vertically adjustable or movable within the jacket 18 to the extent permitted by sliding movement of the pins 20, 22, 30 along the guide slots or tracks 24, 26, 28, that is, between the "heating" position of FIG. 1 and the "serving" position of FIG. 2. When the guide pins are in the top "socket" or end of slot D, the whole assembly can be lifted by the handle (as well as rotated to any extent). When they are in the top of lower slot E, the "collapsed" assembly can be lifted, carried or rotated. When in the lower "sockets" of either slot D or E, the assembly can be rotationally moved without being lifted; subsequent elevation of course changes the position of the guide pins along the slots.

However, it will be observed that when the container 10 is lowered (within the jacket 18) from the extended position of FIG. 2, the pins will arrive at the bottom end of slot E — at which time lower edge 17 will be level with the bottom of the container. It is then desirable to raise the jacket somewhat so that its bottom edge does not contact the hot plate or other heat source. This is accomplished as follows:

A handle 34 is provided for the container 10 by means of which the latter can be manipulated (along the guideways) within the shell or jacket. A pair of diametrically aligned, pivot shafts 36, 38 extend outward from the cylindrical wall 12 to support the respective ends of the handle 34. Each side arm 35, 37 is formed with a tubular end 39 (FIGS. 4–5) which is mounted encircling the shaft 36, 38 and secured by a threaded stud 40 having a flared head 41. A projecting hook or lever arm 42 is positioned so as to abut the underface of the lip 19 when the handle arm 35, 37 is disposed horizontally. Accordingly, after the guide pins have entered into the slot E, when the handle is swung from vertical to horizontal position, the pair of lever arms 42 will lift the jacket 18 (by the lip 19) and the guide pins will drop or seat at the bottom of the slot E, thus holding the jacket as shown in FIG. 1.

The periphery of one pivot shaft (38) is formed with two radially directed, outward-opening sockets 43, 44, spaced 90° apart (FIG. 4). For latch means, a longitudinally displaceable lock pin 46 is located in a bore of the handle arm, alternately alignable with the two sockets 43, 44, and tensioned to seat therein by an expansion spring 48. The outer end of the slidable pin 46 is secured to a cylindrical head 50 having an outward projecting trigger arm 52 by means of which the user can withdraw the lock pin 46 from either of the sockets 43, 44 when it is desired to change the position of the handle, the head 50 and lock pin 46 normally being held in socket-seating position by the expansion spring. It will be seen that the handle 34 is always in upstanding or vertical position when used in raising and lowering the container 10 relative to the attached jacket 18. The alternate or downswung position of FIG. 4 may be taken when the assembly is either telescopicly extended (FIG. 2) or collapsed (FIG. 1) but in the latter case, the lever arms 42 which are dependent from the pivot ends of the handle, will be located intermediate the container and jacket by entrance through the aperture 54 in the lip 19.

It will be apparent that the present annular shape of the container 10 and surrounding jacket 18 is not a necessary limitation of form; the pair could be oval or polygonal, etc., as long as the two are capable of relative vertical displacement. However, cylindrical tubes are usually easier to fabricate or are readily available as initial forms and hence are here illustrated as a preferred embodiment.

I claim:

1. In combination with a portable heating and serving assembly comprising a liquid container and a surrounding support member, the container being vertically shiftable between two positions each surrounded at least partially by said support member, said assembly including guide means for selectively moving said container within the support member between a first position wherein the bottom surface of the container may closely overlie a source of heat and a second position wherein said bottom surface is sufficiently elevated above the first position to allow its liquid contents to be drawn off from its bottom level as into a receiving vessel placed at the lower level, the improvement comprising a carrying handle secured to said container and adapted for use in manually carrying said assembly when the latter is disposed in either of said positions and alternately to raise the container from the first to the second of said positions within the support member, said handle having a contact arm disposed when the container is at said first position to engage the surrounding support member and elevate the same whereby its bottom edge may be raised and thus held above the bottom level of the container when the latter is overlying a source of heat.

2. A heating and serving assembly according to claim 1 wherein said handle carries manually-operable latch means for selectively retaining same at respective carrying position and at support member elevating position.

3. An assembly according to claim 1 wherein said support member and said container are coaxial cylinders.

4. A combination heating and serving assembly comprising a container having a bottom surface selectively disposable at a heating position above a source of heat and having a laterally extending drainage outlet disposed adjacent said bottom surface, an upstanding support member peripherally surrounding said container and formed with a plurality of peripherically separated, generally vertically directed guide channels, a corresponding plurality of container support pins connecting the container and support member movably retained along said guide channels between the heating position and the elevated position, one of said support pins comprising said drainage outlet, whereby when the container is lodged at said elevated position, liquid may be intermittently drawn from said outlet into a cup or the like located at a lower level such as that of the heating position, and a handle having its respective ends pivotally secured adjacent the top of said container, each of said ends having a dependently projecting lever arm located between the container and support member and disposed to lift the latter above the bottom level of said container when the latter is disposed at heating position, upon said handle being swung from upstanding to downswung position.

5. An assembly according to claim 4 wherein the ends of said guide channels are laterally offset to provide anchorage sockets for said support pins, at each of which positions the entire assembly may be picked up or rotated without relative vertical displacement of the container and support member.

* * * * *